(12) United States Patent
Borremans et al.

(10) Patent No.: US 9,233,359 B2
(45) Date of Patent: Jan. 12, 2016

(54) PROCESS FOR THE HYDROCONVERSION OF A LOW QUALITY HYDROCARBONACEOUS FEEDSTOCK

(75) Inventors: Didier Borremans, Boussu (BE); Jean-Pierre Dath, Beloeil Hainault (BE); Kai Hortmann, Dilbeek (BE)

(73) Assignee: TOTAL MARKETING SERVICES, Puteaux (FR)

( * ) Notice: Subject to any disclaimer, the term of this patent is extended or adjusted under 35 U.S.C. 154(b) by 353 days.

(21) Appl. No.: 13/808,425

(22) PCT Filed: Jul. 5, 2011

(86) PCT No.: PCT/EP2011/061281
§ 371 (c)(1),
(2), (4) Date: Mar. 18, 2013

(87) PCT Pub. No.: WO2012/004243
PCT Pub. Date: Jan. 12, 2012

(65) Prior Publication Data
US 2013/0172638 A1    Jul. 4, 2013

(30) Foreign Application Priority Data
Jul. 6, 2010   (EP) ..................................... 10305743

(51) Int. Cl.
*B01J 31/16*       (2006.01)
*B01J 27/051*      (2006.01)
(Continued)

(52) U.S. Cl.
CPC .............. *B01J 27/051* (2013.01); *B01J 23/745* (2013.01); *B01J 27/043* (2013.01); *B01J 31/2295* (2013.01); *B01J 37/20* (2013.01); *C10G 49/12* (2013.01); *B01J 2231/60* (2013.01); *B01J 2531/56* (2013.01); *B01J 2531/64* (2013.01); *B01J 2531/842* (2013.01); *C10G 2300/107* (2013.01); *C10G 2300/1077* (2013.01); *C10G 2300/44* (2013.01); *C10G 2300/703* (2013.01)

(58) Field of Classification Search
CPC ............ B01J 31/00; B01J 31/02; B01J 31/12; B01J 31/122; B01J 31/16; B01J 31/22; B01J 31/2282; B01J 31/2291; B01J 31/2295; B01J 35/00; B01J 35/0013; B01J 35/12
See application file for complete search history.

(56) References Cited

U.S. PATENT DOCUMENTS

| | | | |
|---|---|---|---|
| 3,165,463 A | 1/1965 | Gleim et al. | |
| 4,513,098 A | * 4/1985 | Tsao | ...................... B01J 23/883 208/112 |
| 4,770,764 A | 9/1988 | Ohtake et al. | |

FOREIGN PATENT DOCUMENTS

| | | |
|---|---|---|
| CN | 1373008 A | 10/2002 |
| DE | 34 09 250 A1 | 10/1984 |

(Continued)

OTHER PUBLICATIONS

Eswaramoorthi, I. et al. (2008). Applied Catalysis A: General, 339, 187-195.*

(Continued)

*Primary Examiner* — Brian McCaig
(74) *Attorney, Agent, or Firm* — Sughrue Mion, PLLC

(57) ABSTRACT

The invention concerns a process for upgrading lower quality carbonaceous feedstock using a slurry catalyst composition. The use of particular organometallic compounds as precursors for the dispersed active catalyst allows for reduced coke formation.

14 Claims, 2 Drawing Sheets

Figure 1:
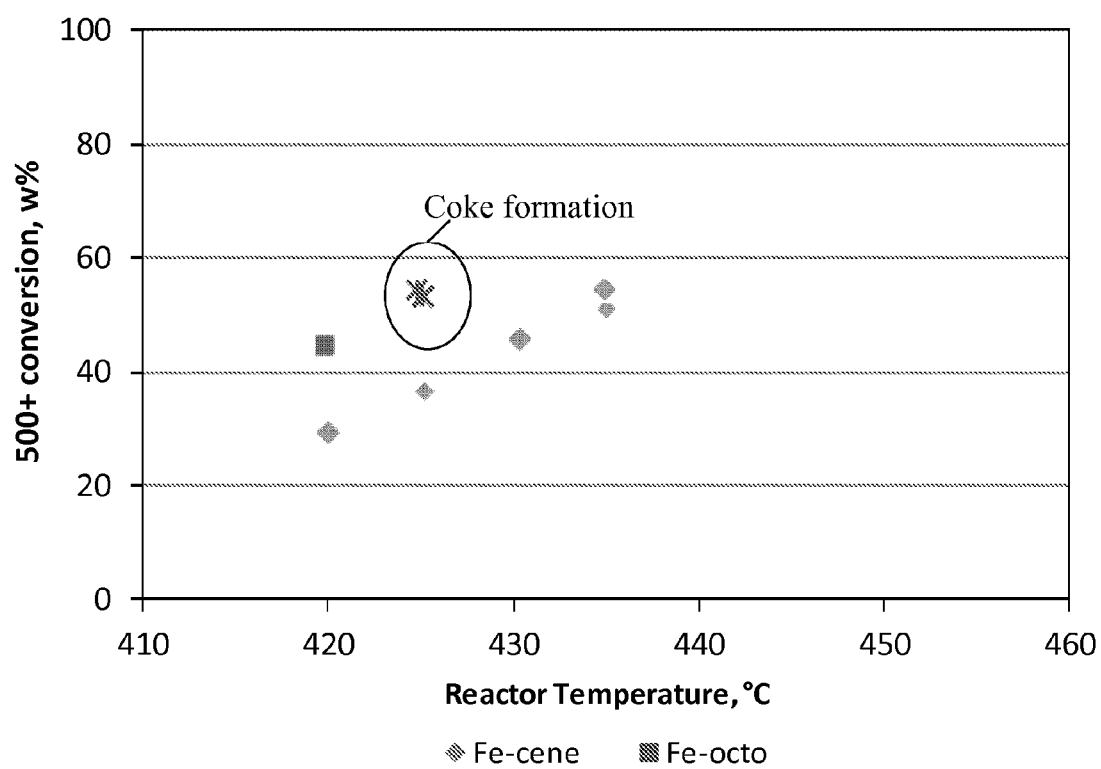

(51) Int. Cl.
*B01J 23/745* (2006.01)
*B01J 31/22* (2006.01)
*B01J 37/20* (2006.01)
*C10G 49/12* (2006.01)
*B01J 27/043* (2006.01)
*B01J 31/00* (2006.01)
*B01J 31/12* (2006.01)

(56) References Cited

FOREIGN PATENT DOCUMENTS

| | | | |
|---|---|---|---|
| EP | 0 199 555 | A2 | 10/1986 |
| JP | 56-065636 | A | 6/1981 |
| JP | 59-172587 | A | 9/1984 |

OTHER PUBLICATIONS

Round-table meeting 'Chemical and physical valorization of coal', Published by the Commission of the European Communities, Luxembourg, 1984.

Summary of the Chinese Office Action in counterpart application.

Partial English translation of E. Wolfrum et al., "The Influence of Iron- and Sulphur-Containing Catalysts on the Hydroliquefaction of Lignite," Commission of the European Communities, pp. 63-84.

Eckhardt Schmidt et al., "Hydrotreatment of 4-(1-Naphthylmethyl)bibenzyl in the Presence of Iron Catalysts and Sulfur", Energy & Fuels, 1996, pp. 597-602, vol. 10.

H.H. Oelert et al., "Laborversuche Zum Einfluss Von Katalysator, Wassergehalt Und Reaktions-Gasangebot Bei Der Hydrierenden Kohleverflossigung", Comm. Eur. Communities, Dec. 1984, pp. 107-115.

International Search Report for PCT/EP2011/061281 dated Aug. 18, 2011.

H.H. Oelert et al., "Laborversuche Zum Einfluss Von Katalysator, Wassergehalt Und Reaktions-Gasangebot Bei Der Hydrierenden Kohleverflossigung," *Comm. Eur. Communities*, Dec. 1984, pp. 107-115.

Communication (Notice of Reasons for Rejection) dated Jun. 23, 2015, issued by the Japanese Patent Office in related Japanese Patent Application No. 2013-517351.

Communication (Patent Examination Report No. 1) dated Jun. 19, 2015, issued by the Australian Patent Office in related Australian Patent Application No. 2011275893.

\* cited by examiner

PROCESS FOR THE HYDROCONVERSION OF A LOW QUALITY HYDROCARBONACEOUS FEEDSTOCK

The present invention relates to a process for upgrading lower quality carbonaceous feedstock using a slurry catalyst composition. This lower quality carbonaceous feedstock is characterized by low hydrogen to carbon ratios and high carbon residues, asphaltenes, nitrogen, sulfur and metal contents.

As the price or shortage of crude oil increases, there is an increasing demand to find ways to better exploit these lower quality feedstocks and extract fuel values there from.

Lower quality feedstocks are characterized as including relatively high quantities of hydrocarbons with an atomic H/C ratio of at least 0.25. They also contain relatively high concentration of sulfur, nitrogen, oxygen and metals. High boiling fractions typically have a high molecular weight and/or low hydrogen/carbon ratio, an example of which is a class of complex compounds collectively referred to as "asphaltenes".

Examples of lower quality feedstock that contains relatively high concentrations of asphaltenes, sulfur, nitrogen and metals include heavy crude and oil sand bitumen, as well as bottom of the barrel and residuum left over conventional refinery process (collectively "heavy oil"). The terms "bottom of the barrel" and "residuum" (or "resid") typically refer to atmospheric tower bottoms, which have a boiling point of at least 343° C., or vacuum tower bottoms, which have a boiling point of at least 524° C. The term "resid pitch" and "vacuum residue" are commonly used to refer to fractions that have a boiling point of 524° C. or greater.

Carbonaceous feedstocks treated by the invention may thus include atmospheric gas oils, vacuum gas oil (VGO), deasphalted oils, olefins, oils derived from tar sands or bitumen, oils derived from coal, heavy crude oils, as well as synthetic oils from Fischer-Tropsch processes and oils derived from recycled oil wastes and polymers.

Such carbonaceous feedstock can not easily be hydroprocessed using hydrogenating supported catalysts. These catalysts comprise a porous carrier, the active phase of the catalyst being dispersed on the surface of the porous carrier. The molecules of the feedstock to upgrade diffuse in the pores up to the active sites on which they react, the reaction products leaving the pores by diffusion.

Molecules of the heavier carbonaceous oils are too large to diffuse inside the pores of supported catalysts or block the pores. It is therefore necessary to use non supported catalysts to upgrade such feedstocks. The active catalytic phase is then directly contacted with the feedstock to be upgraded.

Most often, a precursor in an inactive form of the catalyst is transformed in an active catalyst in a pre-treatment unit before being introduced in the feedstock to upgrade.

These precursors may be carboxylates (octoates, naphthenates, . . . ) or inorganic salts (ammonium hepta molybdate, . . . ) soluble in hydrocarbon compounds or in water or may be non soluble solid compounds, as ores (Iron ore such as limonite).

Carboxylates present the advantage to be more soluble in the hydrocarbons than inorganic salts and solids. As a consequence they are easier to disperse into the feedstock to treat. However, carboxylates present the drawback to be sensitive to oxidation.

There is a need for a catalyst precursor for upgrading lower quality carbonaceous feedstock, such catalyst precursor allowing to obtain a catalyst slurry with improved dispersion in the carbonaceous feedstock and improved activity.

A first object of the invention is a process for the hydroconversion of a low quality hydrocarbonaceous feedstock in which said feedstock is contacted with an active catalytic phase, wherein said active slurry catalytic phase is obtained from a precursor composition comprising at least one organometallic coordination compound of formula $C_1C_2ML_n$ (I), where M is a transition metal selected from group IIA, IIIB, IVB, VB, VIIB, VIIB, VIII, IB or IIB of the periodic table of elements, —$C_1$ and —$C_2$ are monocyclic or polycyclic aryl hydrocarbon ligands that are pi-bonded to M, or monocyclic or polycyclic polyenes ligand pi-bonded to M, —$C_1$ and —$C_2$ being the same or different, each of —$C_1$ or —$C_2$ comprising from 0 to 5 substituents R, each substituent R being the same or different, R being selected from:

a C3-C8, preferably C3-C6, substituted or unsubstituted, monocyclic or polycyclic ring structure that is partially unsaturated, unsaturated or aromatic, fused or not fused to the ligand —$C_1$ or —$C_2$, a C3-C8, preferably C3-C6, substituted or unsubstituted, partially unsaturated or unsaturated, linear or branched, alicyclic hydrocarbyl radical, a C1-C8, preferably C1-C6, substituted or unsubstituted, linear or branched, saturated hydrocarbyl radical, —$C_1$ and —$C_2$ being independent or connected via at least one substituent R, -L is a ligand that is sigma-bonded to M, n is an integer equal to 0 to 3, each -L is, independently, a univalent ligand.

The hydroconversion means a process of hydrocracking, hydrotreating, hydrodesulfurization, hydrodenitrification and hydrodemetalization.

Active catalytic phase is to be understood as a phase containing an active catalyst, said catalyst being non-supported (it is a heterogeneous catalyst slurry). The phase may contain only solids or may be a mixture of solid particles of catalyst and a liquid, advantageously a liquid in which the catalyst is soluble.

By active catalyst, we mean a compound containing a sulfided metal.

A fused ring is a ring having two carbon atoms and one bond in common with another ring.

Advantageously, in formula $C_1C_2ML_n$, each of $C_1$ or $C_2$ is a C5-C8 monocyclic polyene ligand comprising from 0 to 5 substituents R, each substituent R being the same of different, R being defined as above.

Polyenes are poly-unsaturated organic compounds that contain one or more sequences of alternating double and single carbon-carbon bonds.

For example, each of $C_1$ or $C_2$ may be substituted or unsubstituted cyclopentadiene. The substituents may be the same as substituents R described above.

Advantageously, the organometallic coordination compound is a metallocene compound presenting the general formula (II) below

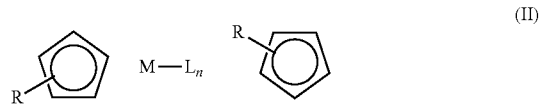

(II)

Where the R substituted or unsubstituted cyclopentadienyl ligands are pi-bonded to M, and L ligands are sigma-bonded to M, and where M, L, R and n are defined as in formula (I).

Thus, metallocene compounds consist of two cyclopentadienyl anions (substituted or not) bound to a metal center in a "sandwich" structure.

Advantageously, in the formulas (I) or (II), M is selected from Group IIA, IIB, IIIB, IVB, VB, VIIB, VIIB or VIII of the periodic table of the elements, preferably M is selected from Fe, V or Mo.

Advantageously, in the formulas (I) or (II), the ligand -L is selected from:

Hydrides (-L=—H)
Halides (-L=—F, —Cl, —Br, —I)
 "Pseudo-halides" (-L=—CN (cyanide))
Alkoxide (-L=—OR)
 Thiolate (-L=—SR)
Amide (-L=—$NR_2$)
 Phosphide (-L=—$PR_2$)
-L=-$ER_3$ or -$EX_3$ (with E=Si, Ge, Sn;)
Alkyl (-L=—$CH_2R$ or other)
 Alkenyl (-L=—CHCHR)
 Alkynyl (-L=—CCR)
Acyl (-L=—COR)
Isocyanide (-L=—CNR)
 Nitrosyl (-L=—NO)
 Diazenide (-L=—NNR)
 Imide (-L=═NR)
-L=—$PR_3$, —$PX_3$, —$AsR_3$, —$SbR_3$ and amines
L=$ER_2$ (with E=O, S, Se, Te)

Where X is a halogen atom and R is a C1-C8, preferably a C1-C6, linear or branched, alkyl, alkenyl Group or a C3-C8 alicyclic or aromatic group.

Advantageously, said precursor composition furthermore comprises at least one surfactant and/or a least one promoter. The surfactant may be alkylamine and the promoter may be selected from Ni, Co, V, W or their mixtures.

In order to improve additive dispersion and to limit foaming, crushed solids or other additives (dispersing agents . . . ) can be added (example crushed coke, 2% wt, granulometry 300 to 500 microns; alumina; thiosilicates; sulfonates of calcium carbonate; as well as any other suitable additive as those described in U.S. Pat. No. 5,594,945).

Advantageously, said precursor composition furthermore comprises a solvent.

Preferably the solvent is soluble in the hydrocarbonaceous feedstock to facilitate the incorporation of the catalyst into the hydrocarbonaceous feedstock. For example, the solvent may be a hydrocarbonaceous compound, advantageously selected from hydrocarbon cuts like vacuum gasoils, cycle oils, gasoils (eg fuel oil . . . ).

In addition, or alternatively, this solvent may serve for sulfiding the metallocene. For example, the solvent may be a hydrocarbonaceous compound, advantageously selected from hydrocarbon cuts like vacuum gasoils, cycle oils, gasoils (non desulfurized gas oils).

Advantageously, according one embodiment of the invention, the process comprises a step of sulfiding said precursor composition using a sulfiding agent. This step permits the activation of the metal contained in the metallocene compound.

In a variant, said sulfiding step is performed before introduction of said precursor in the feedstock to treat (ex situ), or after introduction of said precursor in the feedstock to treat (in situ).

The sulfiding agent may be $H_2S$, DMSO (dimethylsulfoxide), DMDS (dimethyldisulfide), elemental Sulfur, or any appropriate sulfur containing compound. Such sulfur containing compound may be already contained in the solvent or in the feedstock to treat or added to it.

The amount of precursor composition or the amount of active slurry catalytic phase introduced into the feedstock to treat will be determined in order to obtain a predetermined amount of metal in the feedstock on weight basis. These amounts may vary depending on the metal and may be from 0.0005% to 5% by weight of feedstock to treat, preferably from 0.0005 to 3%. For example the amount of Mo may range from 0.0005 to 0.5% by weight of feedstock to treat, the amount of Fe may range from 1 to 3% by weight.

The oil-soluble metal precursors are available either as pure solids (metallocenes) or as solutions in hydrocarbons.

In the pure oil-soluble solid precursors, the metal content is known from the atomic weight of the metal and the molecular weight of the precursor molecule. The amount of precursor to add to the feedstock in order to obtain a given metal concentration in the feedstock can thus be calculated.

The solutions of oil-soluble precursors in hydrocarbons are analyzed on their metal content. The amount of solution to be added to the feedstock in order to obtain a given metal concentration in the feedstock can thus be calculated.

Feedstock

Process according to the invention may be used to upgrade carbonaceous feedstocks comprising an atomic H/C ratio of at least 0.25.

Thus, various feedstocks can be upgraded through this process: atmospheric and vacuum residues, pitch coming from deasphalting, deasphalted oil, visbroken effluents (thermal cracking), shale oils, biomass ex-pyrolysis and ex-hydrothermal treatment, coal and, at least theoretically, petcoke from delayed coker.

Other feedstocks can also be coprocessed together with petroleum residue: tires, polymers, road bitumen.

General characteristics of feedstocks mentioned above are given hereafter in tables 1 to 10 (the data on the feedstocks are indicative as the origin of the crude and the processing conditions may lead to substantial differences in their analyses).

For some feedstocks, results of a typical simulated distillation are given.

Such a simulated distillation method is performed as follows:

Hydrocarbons are introduced in the column of a gas chromatography column and are separated with the increasing ebullating point. Temperature column is increased. Ebullating points are deducted from a calibrating curve, obtained in the same operating conditions with a known hydrocarbon mixture.

The column used is a Simdis HT 750 from Analytical Controls; length=5 m; Film=0.09 µm; Internal Diameter=0.53 mm (AC partno.: 24001.065). As calibration mixture the following may be used:

1. A C5-C28 mixture from Analytical Controls (AC partno.: 59.50.101A),
2. A C30-C120 mixture from Analytical Controls (Ac partno.: 59.50.100B).

IP means Initial Point distillation: temperature corresponding to a curve area of 0.5% of total chromatogram area.

FP means Final Point distillation: temperature corresponding to a curve area of 99.5% of total chromatogram area.

TABLE 1a

Shale oil typical characteristics

| Characteristic | Value observed | Unit |
|---|---|---|
| gravity | 900-1076 | kg/m$^3$ |
| °API | 7.9-25 | |
| C | 78-86 | % wt |
| H | 7.2-12 | % wt |
| H/C | 1.2-1.7 | Atomic ratio |
| O | 0.7-7.5 | % wt |
| S | 0.5-7.5 | % wt |
| N | 0.1-2.5 | % wt |
| Arsine | 5.6-50 | ppm |
| Olefins (Bromine number) | 20-1260 | gBr$_2$/100 g |

TABLE 1b

Shale oil typical Simulated Distillation:

Example of typical Simulated Distillation:

| IP | 80 | °C. |
|---|---|---|
| 10% wt | 200 | °C. |
| 20% wt | 250 | °C. |
| 50% wt | 400 | °C. |
| 70% wt | 450 | °C. |
| 90% wt | 560 | °C. |

Shale oils are impurities rich, some impurities being catalysts poisons, such as Arsine (AsH$_3$). Arsine is the worst poison of hydroprocessing catalyst (NiMo, CoMo). Alternative processes for shale oil refining are hampered by the presence of arsine, which poisons their catalytic functions. During hydrotreatment, arsine is deposed on the catalyst and trapped as nickel arsenide.

In the described process, fresh catalyst is continuously added, so that catalyst poisoning does not impact their process performances or the effluent qualities.

TABLE 2a typical characteristics of Atmospheric and Vacuum residue

| Characteristic | Value observed | Unit |
|---|---|---|
| gravity | 995-1030 | kg/m$^3$ |
| °API | 10.7; 5.8 | |
| C | 82-85 | % wt |
| H | 9-14 | % wt |
| H/C | 1.3-2 | Atomic ratio |
| S | 0.3-4 | % wt |
| Ni | 1-94 | ppm |
| V | 5-448 | ppm |
| Asphaltenes C$_7$ (ASTM D6560) | 2-20 | % wt |

TABLE 2b typical simulated distillation of Atmospheric and Vacuum residues

Example of typical Simulated Distillation:

| IP | 433 | °C. |
|---|---|---|
| 10% wt | 544 | °C. |
| 20% wt | 576 | °C. |
| 50% wt | 636 | °C. |
| 70% wt | 688 | °C. |
| FP 88% wt | 748 | °C. |

TABLE 3a typical characteristics of Pitch

| Characteristic | Value observed | Unit |
|---|---|---|
| Deasphalting solvent | C3 to C5 | — |
| Gravity | 1.1-1.2 to solid | t/m$^3$ |
| Conradson Carbon | 50 | % wt |
| Sulfur | 6.5 | % wt |

TABLE 3b typical Simulated Distillation of Pitch

Example of typical Simulated Distillation:

| 1% wt | 222 | °C. |
|---|---|---|
| 10% wt | 310 | °C. |
| 30% wt | 590 | °C. |
| 50% wt | 682 | °C. |
| FP 57% wt | 740 | °C. |

TABLE 4a typical characteristics of Deasphalted oil

| Characteristic | Value observed | Unit |
|---|---|---|
| Deasphalting solvent | C$_3$ to C$_5$ | — |
| Gravity | 0.970-1.025 | t/m$^3$ |
| Conradson Carbon | 7-22 | % wt |
| Sulfur | 1-5 | % wt |
| Asphaltenes C$_7$ | <0.05-3 | % wt |

TABLE 4b typical Simulated Distillation of Deasphalted oil

Example of typical Simulated Distillation:

| IP | 371 | °C. |
|---|---|---|
| 10% wt | 513 | °C. |
| 20% wt | 543 | °C. |
| 50% wt | 603 | °C. |
| 70% wt | 643 | °C. |
| FP 95% wt | 741 | °C. |

TABLE 5a typical characteristics of Visbroken residue:

| Characteristic | Value observed | Unit |
|---|---|---|
| Gravity | 995-1080 | kg/m$^3$ |
| Conradson Carbon | 22-33 | % wt |

TABLE 5b typical Simulated Distillation of Visbroken residue:

Example of typical Simulated Distillation:

| | | |
|---|---|---|
| IP | 384 | ° C. |
| 10% wt | 496 | ° C. |
| 20% wt | 536 | ° C. |
| 50% wt | 613 | ° C. |
| 70% wt | 680 | ° C. |
| FP 82% wt | 748 | ° C. |

TABLE 6 typical characteristics of Polymers :

| Elemental composition (dry basis) | Value observed | unit |
|---|---|---|
| C | 40-96 | % wt |
| H | 3-4 | % wt |
| H/C | 0.38-1.20 | Atomic ratio |
| O | 0-50 | % wt |

TABLE 7 typical characteristics of Petcoke :

| Elemental composition (dry basis) | Value observed | unit |
|---|---|---|
| C | 86-88 | % wt |
| H | 3-4 | % wt |
| H/C | 0.41-0.56 | Atomic ratio |
| N | 1 | % wt |
| S | 7.5 | % wt |
| Ni + V | 750 | ppm |

TABLE 8 typical characteristics of Pyrolysis Bio-oil

| Characteristic | Value observed | Unit |
|---|---|---|
| Moisture content | 15-30 | % wt |
| Elemental composition (dry basis) : | | |
| C | 54-58 | % wt |
| H | 5-8 | % wt |
| H/C | 1.03-1.78 | Atomic ratio |
| N | 0-0.2 | % wt |
| O | 35-40 | % wt |
| Solids | 0.2-1 | % wt |

TABLE 9 typical characteristics of Slurry from pyrolysis bio-oil, usually sent to gasification

| Characteristic | Value observed | Unit |
|---|---|---|
| Moisture content | 9-18 | % wt |
| Elemental composition (dry basis) : | | |
| C | 72-75 | % wt |
| H | 3-5 | % wt |

TABLE 9-continued typical characteristics of Slurry from pyrolysis bio-oil, usually sent to gasification

| Characteristic | Value observed | Unit |
|---|---|---|
| H/C | 0.48-0.83 | Atomic ratio |
| O | 20-25 | % wt |
| Coke particles | 40 | % wt |

TABLE 10 typical characteristics of Bio-oil ex hydrothermal conversion:

| Characteristic | Value observed | Unit |
|---|---|---|
| Moisture content | 9 | % wt |
| Elemental composition (dry basis) : | | |
| C | 73.7 | % wt |
| H | 7.6 | % wt |
| H/C | 1.24 | Atomic ratio |
| O | 15.3 | % wt |
| N | 3.3 | % wt |

The following examples and figures illustrate the process of the invention.

FIG. 1 represents the conversion of the $500^+$ fraction as a function of the reactor temperature with two oil-soluble iron catalyst precursors: ferrocene (Fe-cene) and iron octoate (Fe-octo). Conditions tested (example 1): reaction time=1 h; catalyst concentration=5000 wppm metal. Crosses (x) indicate runs where coke formation occurred.

Figure 2:
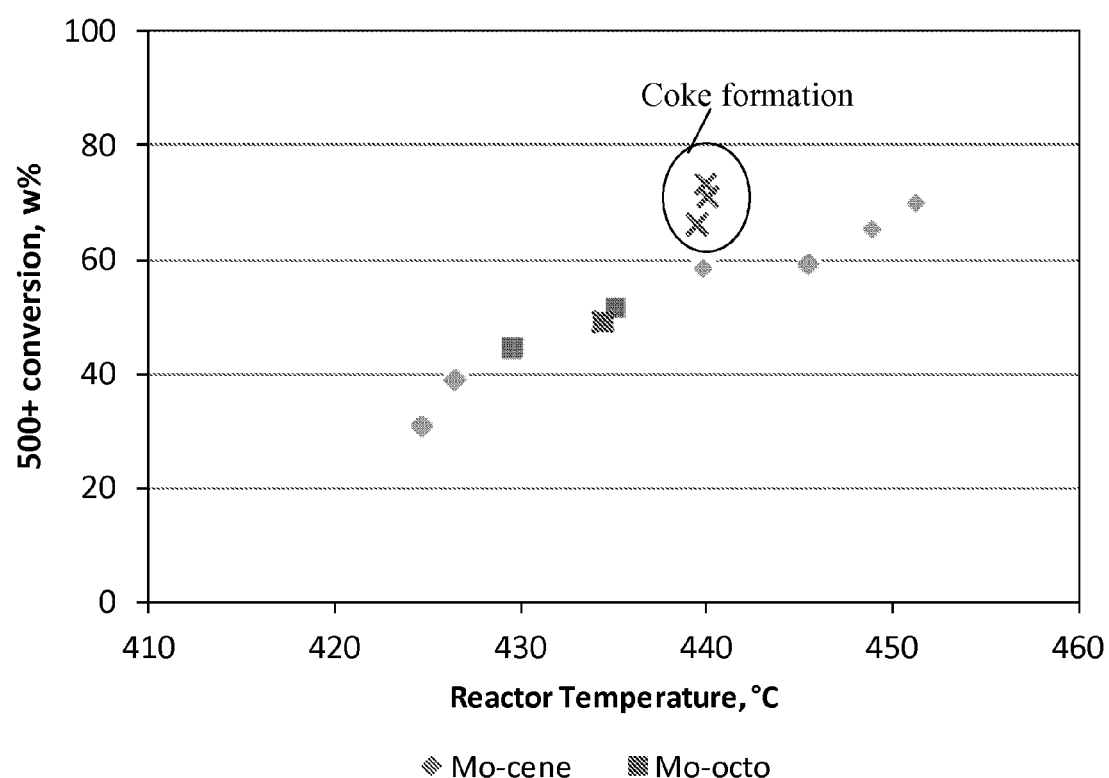

FIG. 2 represents the conversion of the $500^+$ fraction as a function of the reactor temperature with two oil-soluble molybdenum catalyst precursors: molybdenocene (Mo-cene) and molybdenum octoate (Mo-octo). Conditions tested (example 2): reaction time=1 h; catalyst concentration=5000 wppm metal. Crosses (x) indicate runs where coke formation occurred.

EXAMPLES

Hydroconversion and hydrotreatment of a vacuum residue have been performed. The tested vacuum residue presents the following characteristics:

TABLE 11 characteristics of vacuum residue tested (Arab Heavy Vacuum residue)

| Characteristic | Value |
|---|---|
| API | 3 |
| Density at 15° C. (g/ml) | 1.0581 |
| Sulfur (w %) | 5.58 |
| Nitrogen (w %) | 0.54 |
| MCRT ASTM D4530 (w %) | 25.0 |
| Asphalthenes (C7 insol.), w % | 19.7 |
| C, w % | 84.2 |
| H, w % | 9.9 |
| H/C, atomic ratio | 1.41 |
| Ni, ppm | 70 |
| V, ppm | 215 |
| Cut points from ASTM D7169 | |
| IBP - 200° C. fraction (w %) | 0.0 |
| 200-350° C. fraction (w %) | 0.0 |

TABLE 11-continued characteristics of vacuum residue tested
(Arab Heavy Vacuum residue)

| Characteristic | Value |
|---|---|
| 350-500° C. fraction (w %) | 3.10 |
| 500-FBP fraction (w %) | 96.9 |

MCRT: Micro Carbon Residue Test

All tests have been performed in a 500 ml stirred batch reactor with continuous hydrogen feeding at constant pressure. The operating conditions are total pressure at 15 MPa, temperature between 420 and 450° C., $H_2$ flow set at 100 NL/h and stirring speed of 900 rpm.

The vacuum residue is pre-heated to reduce its viscosity and allow its transfer to the reactor. Catalyst precursors (molybdenum octoate, iron octoate, ferrocene and/or molybdenocene) and liquid DMDS are added to the pre-heated vacuum residue in the reactor which is then closed. Hydrogen is then added and temperature increased with two stages at 250° C. and 320° C. for 10 minutes each. Then the reactor temperature is raised rapidly to the operating value.

At the end of the test, the reactor is cooled down and depressurized. All gaseous and liquid effluents are collected, weighed and analysed.

The gases are analysed on-line by gas chromatography (Agilent G2891 micro Gas Chromatograph) and the reaction products are analysed by high temperature gas chromatography (ASTM D7169) for determining the yields.

Example 1

Test series have been performed to compare ferrocene and iron octoate as precursors of an active catalytic phase for the hydroconversion of a vacuum residue.

Ferrocene has the following formula: $Cp_2Fe$ (or $Fe(C_5H_5)_2$).

Iron octoate has the following formula: $C_{24}H_{45}FeO_6$

The different tests of a series have been performed at increasing temperature in the 420-450° C. range.

300 mL of feedstock and iron based catalyst precursor are fed into the reactor. For each catalyst precursor, 5000 wppm of Fe as $Cp_2Fe$ or as Fe-octoate, is added to the feedstock (wppm: based on the weight of the feedstock). 130 mol % of sulphur (compared to iron) as DMDS is also fed into the reactor as sulphiding agent. The reactor is pressurized with hydrogen and heated to the desired temperature at a heating rate of 5° C./min.

Several tests have been performed with increasing temperature, until coke production appears. This temperature is considered as the maximum allowable temperature for hydroconversion using the particular slurry phase catalyst.

The results are presented in FIG. 1. In this graph conversions are plotted against temperature. The runs in which coke formation occurred are represented by crosses.

With iron octoate as precursor, coke formation occurred at 425° C. The maximum 500+ conversion without coke formation was observed at 420° C., and was of 45 w %.

With ferrocene as precursor, temperature could be raised to 435° C. without coke formation. The 500+ conversion observed at this temperature was of 57 w %.

This example series shows the potential of metallocenes as precursors for obtaining high hydrogenation activity catalysts for heavy feedstocks hydroconversion.

Example 2

Tests have been performed to compare bis(cyclopentadienyl)molybdenum dichloride and Mo-octoate as precursors of an active catalytic phase for the hydroconversion of a vacuum residue.

bis(cyclopentadienyl)molybdenum dichloride has the following formula: $Cp_2MoCl_2$ (or $(C_5H_5)_2MoCl_2$).

Molybdenum octoate has supposedly the following formula: $C_{32}H_{60}MoO_8$

The different tests of a series have been performed at increasing temperature in the 420-450° C. range.

300 mL of feedstock and molybdenum based catalyst precursor are fed into the reactor. For each catalyst precursor, 500 wppm of Mo as $Cp_2MoCl_2$ or as Mo-octoate, is added to the feedstock (wppm: based on the weight of the feedstock). 260 mol % of sulphur (compared to molybdenum) as DMDS is also fed into the reactor as sulphiding agent. The reactor is pressurized with hydrogen and heated to the desired temperature at a heating rate of 5° C./min.

Several tests have been performed with increasing temperature, until coke production appears. This temperature is considered as the maximum allowable temperature for hydroconversion using the particular slurry phase catalyst.

The results are presented in FIG. 2. In this graph conversions are plotted against temperature. The runs in which coke formation occurred are represented by crosses.

With molybdenum octoate as precursor, coke formation occurred at 440° C. The maximum 500+ conversion without coke formation was observed at 435° C., and was of 52 w %.

With bis(cyclopentadienyl)molybdenum dichloride as precursor, temperature could be raised to 450° C. without coke formation. The 500+ conversion observed at this temperature was of 70 w %.

The use of a molybdenocene allows applying higher temperatures than the use of Mo-octoate, thus leading to deeper conversions together with the absence of coke formation.

Example 3

The same test has been performed without any catalyst and with a blend of atmospheric residue. The composition of this feedstock is given in table 12. The feedstock was processed during 30 min at a temperature of 420.5° C.

An important amount of coke was produced, which illustrates the effect of catalyst for suppression of coke.

TABLE 12 characteristics of vacuum residue tested
(Arab Heavy Vacuum residue)

| Characteristic | Value |
|---|---|
| API | |
| Density at 15° C. (g/ml) | 0.9671 |
| Sulfur (w %) | 3.13 |
| Nitrogen (w %) | 0.25 |
| MCRT ASTM D4530 (w %) | 8.3 |
| Asphalthenes (C7 insol.), w % | 2.9 |
| Ni, ppm | 20 |
| V, ppm | 50 |
| Cut points from ASTM D7169 | |
| IBP - 200° C. fraction (w %) | 0.0 |
| 200-350° C. fraction (w %) | 5.1 |
| 350-500° C. fraction (w %) | 40.9 |
| 500-FBP fraction (w %) | 54.0 |

MCRT : Micro Carbon Residue Test

The invention claimed is:

1. A process for the hydroconversion of a lower quality hydrocarbonaceous feedstock, wherein the process comprises:
    converting a precursor composition into an active slurry catalytic phase, and
    hydroconverting the lower quality hydrocarbonaceous feedstock using the active slurry catalytic phase; and
    wherein the precursor composition comprises at least one organometallic coordination compound of formula $C_1C_2ML_n$ (I), where
    M is a transition metal selected from group IIA, IIIB, IVB, VB, VIB, VIIB, VIII, IB or IIB of the periodic table of elements, and wherein M is not Fe,
    —$C_1$ and —$C_2$ are monocyclic or polycyclic aryl hydrocarbon ligands that are pi-bonded to M, —$C_1$ and —$C_2$ being the same or different, each of —$C_1$ or —$C_2$ comprising from 0 to 5 substituents R, each substituent R being the same or different, R being selected from:
        a C3-C8 substituted or unsubstituted, monocyclic or polycyclic ring structure that is partially unsaturated, unsaturated or aromatic, fused or not fused to the ligand —C1 or —C2,
        a C3-C8 substituted or unsubstituted, partially unsaturated or unsaturated, linear or branched, alicyclic hydrocarbyl radical,
        a C1-C8, substituted or unsubstituted, linear or branched, saturated hydrocarbyl radical,
    —$C_1$ and —$C_2$ being independent or connected via at least one substituent R,
    -L is a ligand that is sigma-bonded to M, n is an integer equal to 0 to 3, each -L is, independently, a univalent ligand.

2. The process according to claim 1, wherein each of $C_1$ or $C_2$ is a C5-C8 monocyclic polyene ligand comprising from 0 to 5 substituents R, each substituent R being the same of different, R being defined as in claim 1.

3. The process according to claim 1, wherein each of $C_1$ and $C_2$ is a cyclopentadienyl ligand comprising from 0 to 5 substituents R, each substituent R being the same or different, R being defined as in claim 1.

4. The process according to claim 1, wherein the organometallic coordination compound is a metallocene compound presenting the general formula (II) below

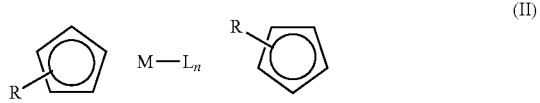

wherein the R substituted or unsubstituted cyclopentadienyl ligands are pi-bonded to M, and L ligands are sigma-bonded to M, and where M, L, R and n are defined as in formula (I).

5. The process according to claim 1, wherein -L is selected from Hydride (-L=—H), Halide (-L=—F, —Cl, —Br, —I), cyanide (-L=—CN), Alkoxide (-L=—OR), Thiolate (-L=—SR), Amide (-L=—NR2), Phosphide (-L=—PR2), Alkyl (-L=—CH2R or other), Alkenyl (-L=—CHCHR), Alkynyl (-L=—CCR), Acyl (-L=—COR), Isocyanide (-L=—CNR), Nitrosyl (-L=—NO), Diazenide (-L=—NNR), Imide (-L=—NR), L=-ER3 or -EX3 (with E=Si, Ge, Sn), -L=—PR3, —PX3, —AsR3, —SbR3, amines, L=ER2 (with E=O, S, Se, Te), where X is an halogen atom, R is a C1-C8, preferably a C1-C6, linear or branched, alkyl, alkenyl Group or a C3-C8 alicyclic or aromatic group.

6. The process according to claim 1, wherein M is selected from Group IIA, IIB, IIIB, IVB, VB, VIB, VIIB or VIII of the periodic table of the elements, and wherein M is not Fe.

7. The process according to claim 1, wherein M is V or Mo.

8. The process according to claim 1, wherein said precursor composition furthermore comprises at least one surfactant and/or a least one promoter.

9. The process according to claim 1, wherein said precursor composition furthermore comprises a solvent.

10. The process according to claim 9, wherein the solvent is a hydrocarbonaceous compound.

11. The process according to claim 1, comprising a step of sulfiding said precursor composition using a sulfiding agent.

12. The process according to claim 11, wherein said sulfiding step is performed before introduction of said precursor in the feedstock or after introduction of said precursor in the feedstock.

13. The process according to claim 1, wherein the lower quality hydrocarbonaceous feedstock an atomic H/C ratio of at least 0.25.

14. The process according to claim 1, wherein the lower quality hydrocarbonaceous feedstock is selected from atmospheric and vacuum residues, pitch coming from deasphalting, deasphalted oil, visbroken effluents, shale oils, biomass ex-pyrolysis, biomass ex-hydrothermal treatment, coal, petcoke from delayed coker, tires, polymers, road bitumen.

* * * * *